I. COE.
FRUIT-GATHERER.
No. 170,056.    Patented Nov. 16, 1875.
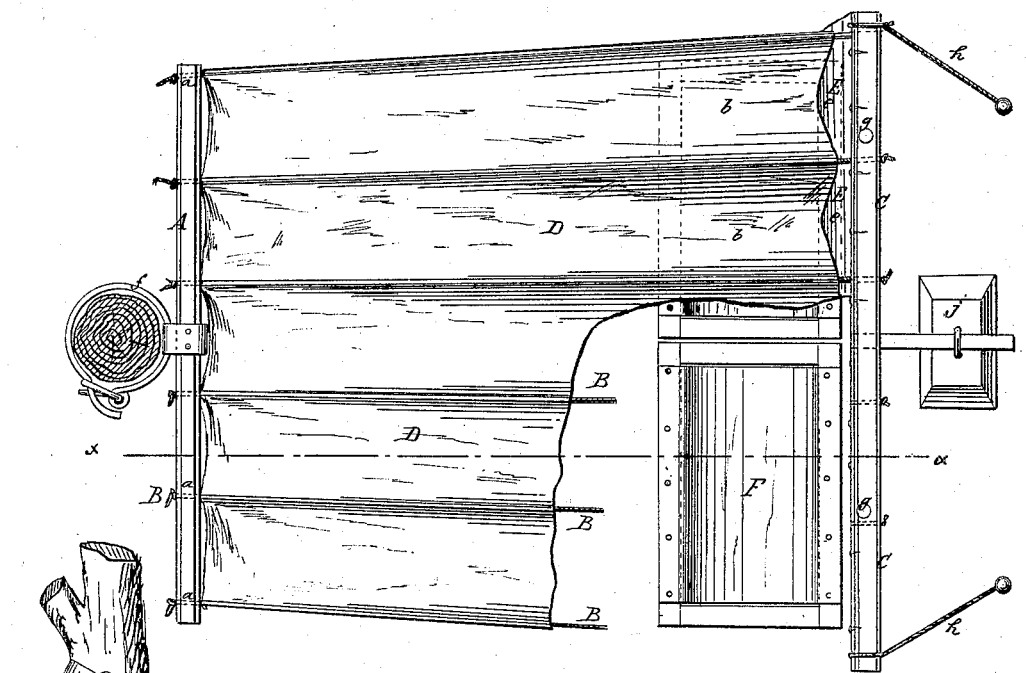
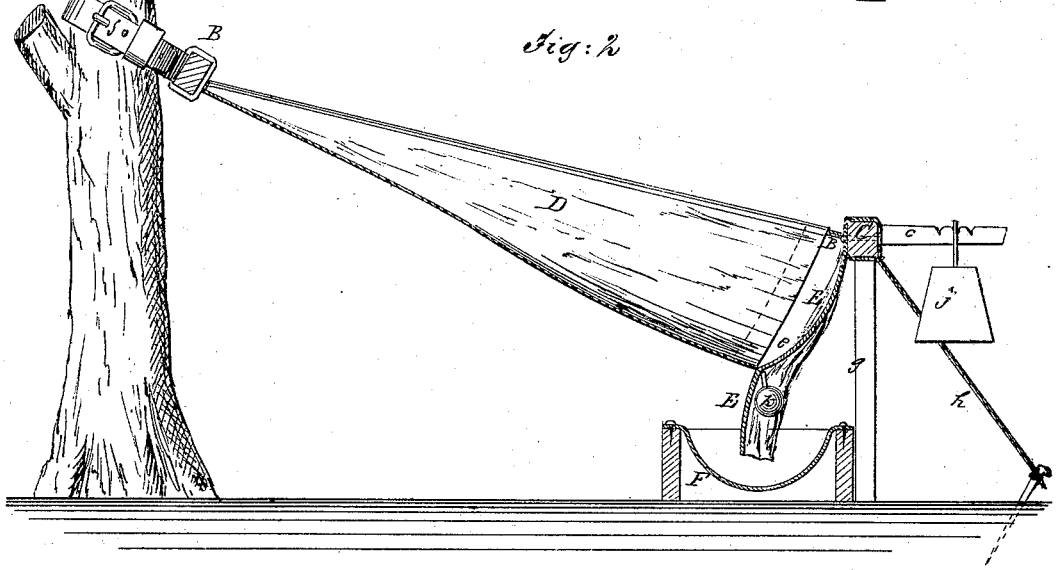
Witnesses:    Inventor:

UNITED STATES PATENT OFFICE.

IRA COE, OF QUINCY, ILLINOIS.

IMPROVEMENT IN FRUIT-GATHERERS.

Specification forming part of Letters Patent No. 170,056, dated November 16, 1875; application filed May 24, 1875.

*To all whom it may concern:*

Be it known that I, IRA COE, of Quincy, in the county of Adams and State of Illinois, have invented a new and Improved Fruit-Gatherer; and that the following is a full, clear, and exact description of the same, reference being had to the accompanying drawings, and to the letters of reference marked thereon, making a part of this specification.

This invention is in the nature of an improvement in fruit-gatherers; and the invention consists in a fruit-gatherer constructed with an adjustable and flexible catcher and conveyer, as is hereinafter fully shown and described.

In the accompanying sheet of drawings, Figure 1 represents a plan or top view of my invention; and Fig. 2, a cross-section of same in line $x\, x$, Fig. 1.

Similar letters of reference indicate like parts in the two figures.

A represents a bar, which may be of any convenient size. This bar is perforated with a series of holes, $a$, through which are passed cords B. These cords are fastened at one end to the bar A, and their other ends are fastened to a second bar, C. This second bar is somewhat longer than the bar A. To the cords B is secured in any desirable way a cloth apron, D. This apron is so secured to the cords B that a series of plaits or folds, $b$, are formed between each two of the cords, the plaits extending in depth from the bar A downward to the end of the apron, as shown in Fig. 2.

Secured to the inner edge or side of the bar C is a small apron or flap, E. This flap is affixed to the bottom of each plait $b$ at their lower ends, and leaving an opening, $e$, at each of its points of attachment. To the outer side of the bar C is affixed a pin, $c$.

My fruit-gatherer being constructed substantially as above described, it is operated by strapping or otherwise securing to the tree, at a suitable distance from the ground, the bar A.

The strap holding the bar may be supported by a branch, as shown at $f$, Figs. 1 and 2. The bar C, with the apron and flap secured thereto, as above described, is then extended from the tree, and supported by two posts, $g$, which are attached to it. The bar C may then be steadied by guys $h\, h$ at its ends.

Immediately below the lower end of the apron are placed suitable receptacles F F. These receptacles may be of any suitable kind, but are preferably made with canvas bottoms. And to the pin $c$ is hung a weight, $j$, which tends to keep extended the gatherer.

Now, as the fruit is gathered from that portion of the tree immediately above the gatherer, it is allowed to fall onto the gatherer, which, being inclined, as shown in Fig. 2, causes the fruit as it falls to roll by gravity down the folds $b$, which become conductors for it, and lead it to their lower end, where it strikes the flap E, and thence through the openings $e$ into the receptacles F F.

The fruit is thus gathered without bruising, for the gatherer, being constructed of soft and yielding material, can in nowise injure it; and the receptacles having soft and flexible bottoms, the fruit is not bruised when received by them, so that it can in nowise be injured when being gathered.

As the fruit is gathered from one side or portion of the tree, the operation is continued on some other part of the tree by simply loosing the guys $h\, h$ and moving the gatherer beneath the ungathered fruit, and proceed as before.

To prevent the wind from blowing and disturbing the gatherer at its lower end, or the flap E, I fix a series of weights, $k\, k$, to the flap E, where it is attached to the folds $b$ of the apron D.

Having thus described my invention, what I claim as new, and desire to secure by Letters Patent, is—

1. In a fruit-gatherer, the combination of the bars A C, of unequal lengths, cords B, and canvas D, arranged over said cords in folds or depressions, increasing in depth toward the discharge ends, substantially as and for the purpose described.

2. A fruit-gatherer composed of the bars A C, cords B, and canvas D, in combination with the strap *f*, whereby said gatherer is attached to a tree and adapted to be moved into different positions around said tree, substantially as shown and described.

3. In a fruit-gatherer, the beams A C, cords B, and canvas or apron D, forming folds or gutters of increasing depth toward their discharging ends, in combination with the weighted flaps E, substantially as shown and described.

<div style="text-align:right">IRA COE.</div>

Witnesses:
    THEODORE C. POLING,
    IRA COE.